Aug. 5, 1952         D. I. BOHN              2,605,963
                METER INTEGRATOR AND MULTIPLIER
Filed Aug. 18, 1945                       6 Sheets-Sheet 1

INVENTOR.
DONALD I. BOHN
BY
Ostrolenk and Faber
ATTY.

INVENTOR.
DONALD I. BOHN
BY
Ostrolenk and Faber
ATTY.

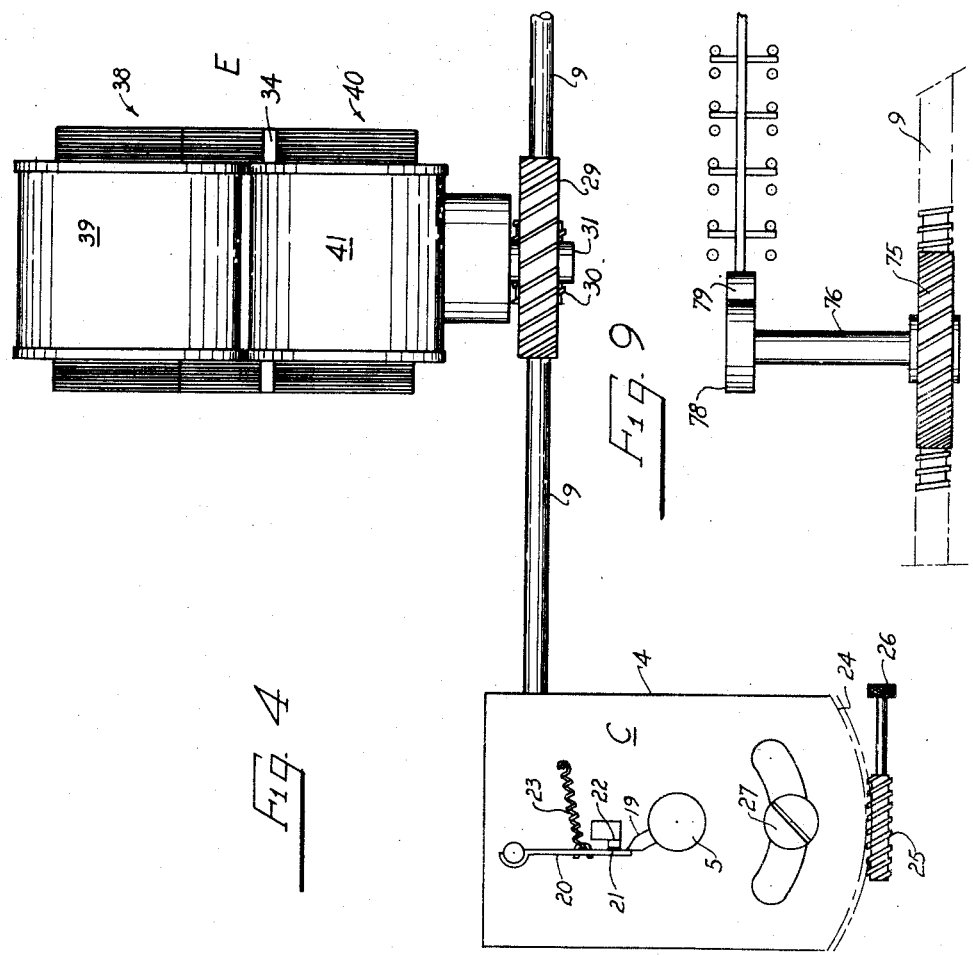

Aug. 5, 1952  D. I. BOHN  2,605,963
METER INTEGRATOR AND MULTIPLIER
Filed Aug. 18, 1945  6 Sheets-Sheet 5
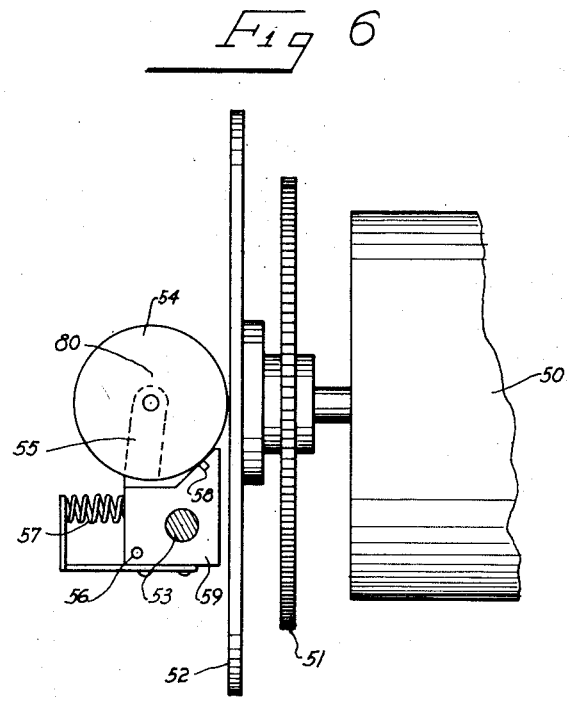
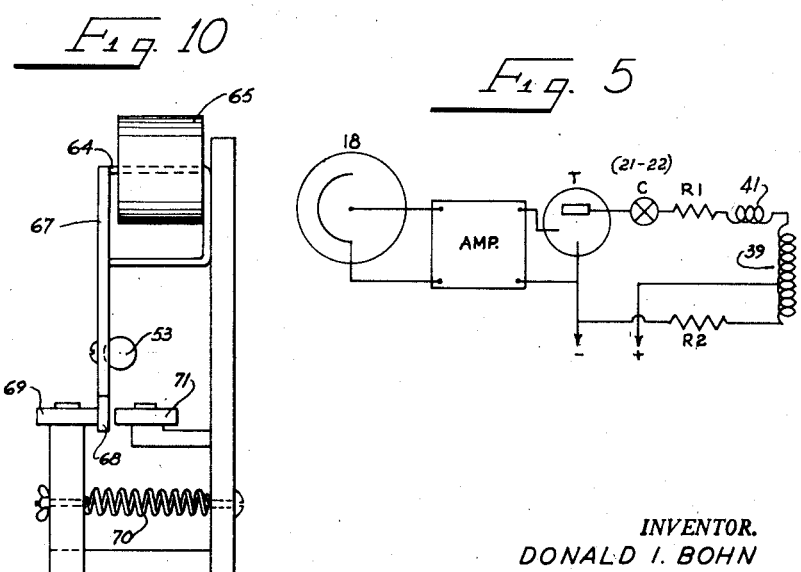
INVENTOR.
DONALD I. BOHN
BY
Ostrolenk and Faber
ATTY.

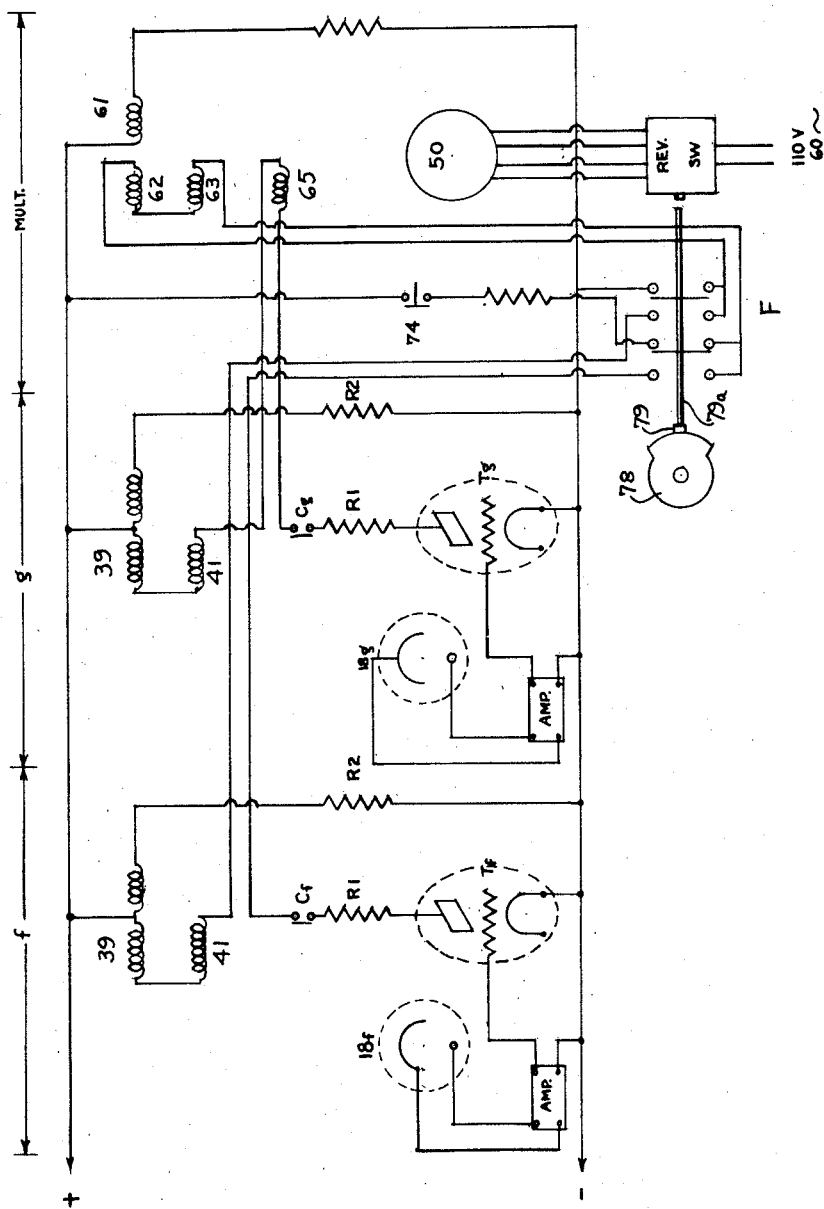

Patented Aug. 5, 1952

2,605,963

UNITED STATES PATENT OFFICE 2,605,963

METER INTEGRATOR AND MULTIPLIER

Donald I. Bohn, Pittsburgh, Pa.

Application August 18, 1945, Serial No. 611,383

15 Claims. (Cl. 235—61)

This invention relates to means for obtaining the integral with respect to time of any physical quantity which is normally measurable; and also pertains to means for obtaining the integral with respect to time of the product of any two physical quantities which are readily measurable.

The integral with respect to time of purely electrical quantities, such as voltage current or power can and has been made by special integrating devices involving electrical mechanisms. Devices for obtaining the integral with respect to time of the product of two electrical quantities, such as voltage and current, to obtain watt seconds can and have been constructed. In this latter case, multiplication is obtained electrically as, for example, in the conventional watt-hour meter.

It may, however, be desired at times to obtain either of these two integrals simply from the pointer indications of a meter. This would make the functioning of the apparatus independent of the particular operation which caused deflection of the pointer of the meter, and hence allow it to be applied equally well to pressure gauges or any other indicating instrument.

Devices for obtaining the integral with respect to time of the reading of a pointer meter are known in the art but usually involve mechanical coupling devices to the pointer of the meter. This would require a specially designed meter for this purpose or a considerable alteration of an existing meter. In addition, the attachment would create new torques which might require recalibration and readjustment or may possibly interfere with the accuracy of the instrument altogether.

The present invention provides a device for obtaining the integral with respect to time of the indication of a pointer meter in such a manner that no elaborate operations are necessary and also in such a manner that no new torques are introduced which might cause difficulties and inaccuracies.

To apply this invention to one pointer meter for obtaining the integral with respect to time or to two pointer meters for obtaining the integral of the product of their readings with respect to time, it is necessary to provide each of the meters with a pointer carrying a small mirror at its extremity, this mirror preferably rotating in front of a darkened background. The mirror could, for instance, simply be a polished spot or target tip of the pointer.

The present device takes cognizance of the indication of the pointer meter by optical means and, therefore, creates no torques. It is then also obvious that it may be applied equally well to any type of pointer meter, for instance, to pressure gauges as readily as to electrical instruments.

In both versions of the invention, the integral with respect to time is approximated by a sum. Such integration by finite sum is known to be accurate with a high degree of precision, as long as the quantity being integrated does not undergo appreciable fluctuations between the points on which the sum is taken.

The present invention will sum the readings of the pointer meters or the value of the product of two readings of two pointers taken at uniform intervals at the order of magnitude of one second. Hence, the invention is particularly applicable to integrating those quantities which vary relatively slowly in time such as electrical currents to diversified loads, steam pressures, and so forth.

In operation, the invention first converts the indication of a pointer meter into a time interval by means of light scanning. This time interval is then converted into an angle of increment. These angles of increment are then summed to give a total elapsed angle. This elapsed angle is therefore proportional to the sum of the readings of the meter and is therefore approximately equal to the integral with respect to time of these readings.

In the version of the invention which obtains the integral of the product of two meters, use is made of a conventional distant roller integrating mechanism. Such a mechanism consists of a parallel disc rotating at constant speed upon which bears a roller. The roller is movable across the face of the disc and hence rotates at a speed proportional to the radial distance of the center of the roller to the center of the disc. The conventional application of these disc and roller indicating mechanisms makes use of the fact that total single excursion of the roller is proportional to the integral with respect to time of the radial distance of the roller from the center of the disc.

In the present instance, let $f$ be the indication of the first pointer given the instantaneous value of some one physical quantity, and let $g$ be the indication of the second pointer meter giving the value of some second physical property. By means of two light scanning mechanisms, these two quantities $f$ and $g$ are converted into time intervals $\Delta t_f$ and $\Delta t_g$. $\Delta t_f$ is then converted by means of a mechanism, to be described, into $r$, the radial distance of the roller from the center of the constant speed disc; and a second mechanism, to be described, causes the roller to move into contact with the constant speed disc for an interval of time $\Delta t_g$. Therefore, within one scanning interval, the roller has rotated through an elapsed angle proportional to the product of $fg$ because its radial distance was proportional to $f$ and its time of contact with the constant speed disc was proportional to $g$.

This version of the invention then provides, as is described in detail subsequently, means for returning the roller to the center of the disc at the end of each scanning interval. Since this process being repeated in each scanning interval, it can then be seen that the total cumulative rotation of the roller is proportional to the sum of the products $fg$ taken at regular time intervals, namely the constant scanning interval.

As has been mentioned previously, it is first of all necessary in either version to convert a pointer reading, say, $f$, into a time interval of, say, $\Delta t_f$. This is accomplished by obtaining two electrical impulses, one at the beginning of the interval $\Delta t_f$ and one at its end. It is then also necessary to convert this time interval $\Delta t_f$ into an angle of increment $\Delta \theta$. The means by which this is accomplished will become clear in the detailed description of the apparatus taken in connection with drawings:

Figure 4 is another view of the same integrating device taken from line 4—4 of Figure 1.

Figure 5 is an electrical wiring diagram associated with the integrating device.

Figure 6 is an end view of the integrator multiplier.

Figure 8 is a wired diagram of two integrators and an associated integrator multiplier.

Figure 9 is an elevation view of the cam switch utilized in the integrator multiplier.

Figure 10 is an end view of a magnet assembly used in the integrator multiplier.

Figure 1:
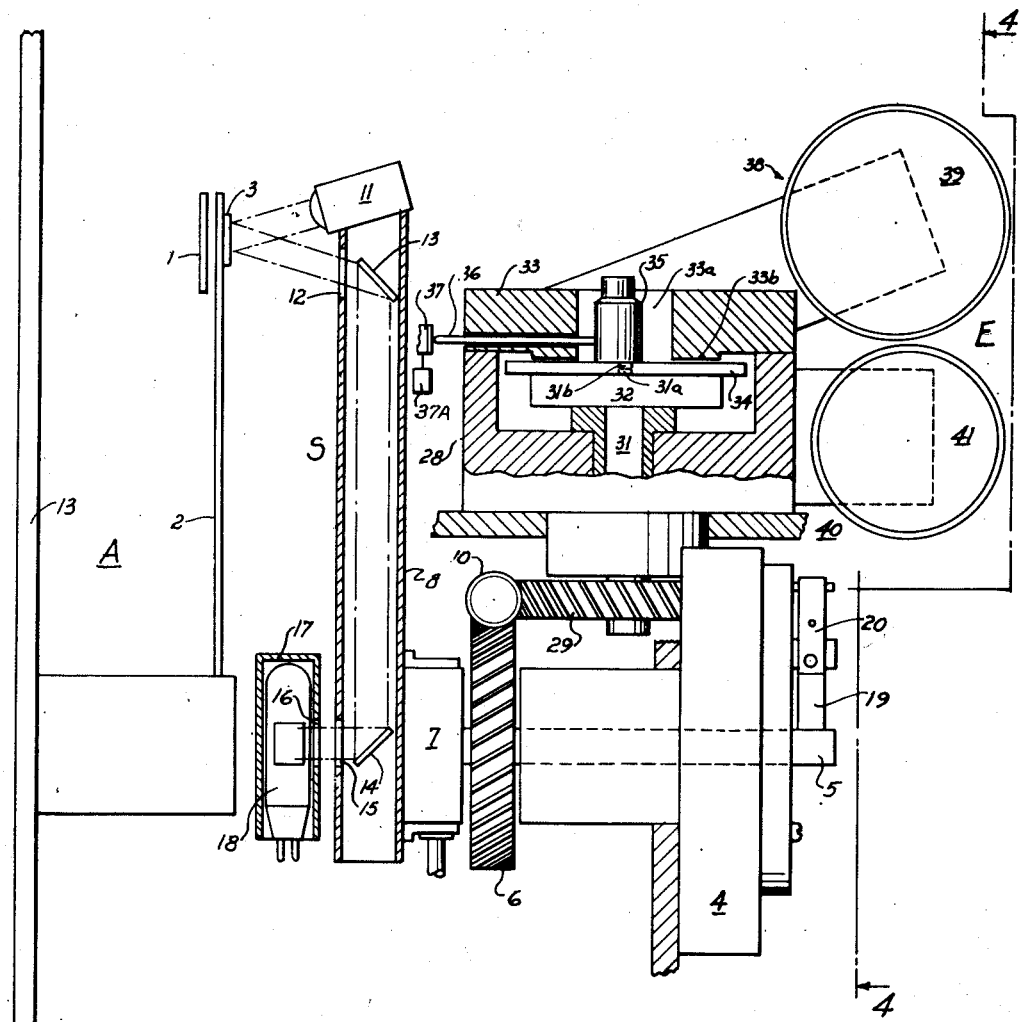
Figure 1 is a side view of an indicating meter in front of which is placed an integrating device.
Figure 3:
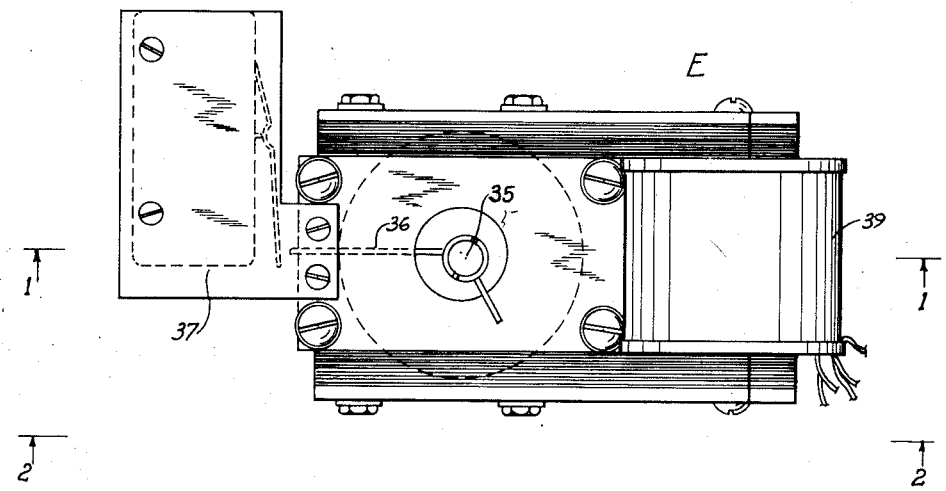
Figure 3 is a top view of the member of Figure 2.
Figure 2:
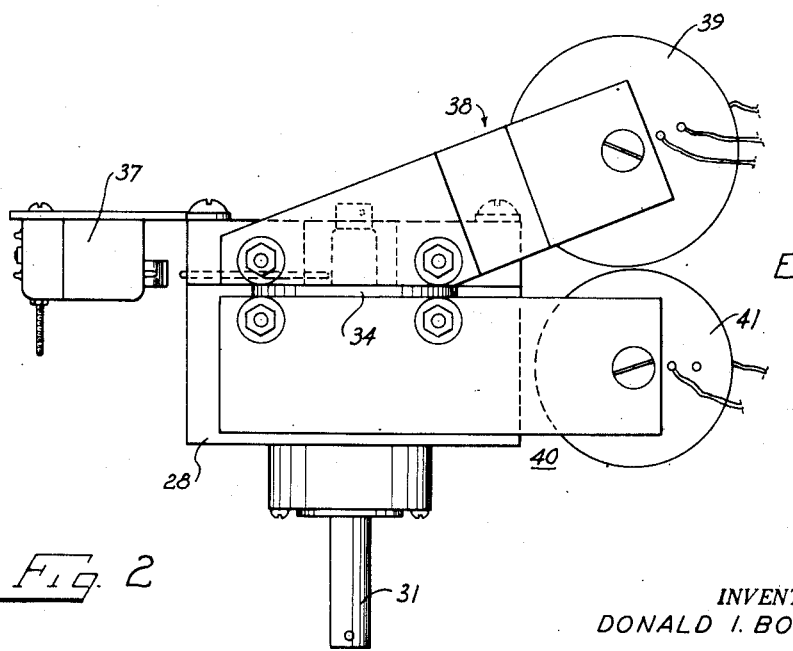
Figure 2 is a side view of a portion of the device of Figure 1.

Referring to Figure 1, the pointer meter A, mounted on instrument panel board 13, has a scale 1, a pointer 2 and a small mirror 3 attached to the extremity of the pointer 1. This mirror may be either cemented onto the pointer or may consist merely of a polished area of the pointer.

The rest of Figure 1 is part of the scanning and integrating device which comprises part of this invention, and it will be noticed that it makes no physical contact with the meter A.

The scanning device consists primarily of a rotating arm 8 which rotates in a plane parallel to the front of the meter and about an axis concentric with the axis of the meter. This concentricity is simply accomplished by positioning the integrating device properly in front of the meter. The scanning arm 8 consists of a hollow tube to which is affixed a bearing 7 and which is driven by gear 6 from worm 10, worm 10 being eventually driven by a synchronous motor or some other constant speed prime mover.

The scanning tube 8 carries at its extremity a lamp 11, so positioned that light therefrom shown in Figure 1 in dotted lines will fall upon the mirror 3 once each revolution. When this happens, the light from lamp 11 is reflected through aperture 12 in arm 8 onto the properly positioned diagonal mirror 13. The beam is therefore subsequently reflected along the axis of tube 8 until it strikes mirror 14.

Mirrors 13 and 14 are rigidly attached to arm 8. Mirror 14, making an angle of 45° with the axis of the scanning arm 8, therefore reflects the light beam through aperture 15 which is concentric to the axis of rotation of arm 8. The light then impinges upon a stationary photocell 18 enclosed in the stationary housing 17 containing an aperture 16 concentric to the aperture 15 in the scanning arm 8. It is therefore seen that an electrical impulse is obtained from photocell 18 once each revolution of the scanning arm and that the phase position of this impulse with respect to the scanning cycle is determined by the angular position of pointer 2.

For purposes of the invention, it is necessary to obtain two electrical impulses in such a manner that the elapsed time between them is proportional to the reading of the pointer meter A. It is now obvious that this can be accomplished if another impulse is obtained when the scanning lamp passes the normal zero mark of meter A. Since the position of this zero is fixed, such an impulse can readily be obtained by a contact on the driving shaft to the scanning arm.

Scanning arm 8, bearing 7 and gear 6 are all carried upon shaft 5 which extends to the right in Figure 1 through the subsidiary panel 4 upon which is mounted the contacting device mentioned above.

The functioning of this contactor will become clear from an inspection of Figure 4 which is an end view taken from the right of the apparatus shown in part in Figure 1.

In Figure 4, C (4) is the subsidiary panel mentioned above, and 5 is the shaft driving the scanning arm. A protuberance 19 attached to shaft 5 strikes lever 20 once each revolution.

In the embodiment of the invention now described, the scanning arm rotates in a counterclockwise direction facing the meter; hence in the view of Figure 4, shaft 5 also rotates in a counterclockwise direction. It is seen therefore that contacts 21 and 22 attached to lever 20 are opened momentarily once each revolution of shaft 5. Otherwise, they are held close by tension spring 23.

For the purposes of the invention, it is necessary that the contact open at the precise instant when the scanning lamp passes the fixed zero mark of meter A. Provision is made for an adjustment to accomplish this purpose. The adjustment is achieved by rotating subsidiary panel C about shaft 5 manually through a slight arc. Slow and accurate rotation of panel C is accoomplished by means of worm 25 meshing with gear sector 24 which is an integral part of panel C. Worm 25 may be rotated manually by a knurled nut 26. When the desired adjustment is achieved, panel C may be locked in position by locking screw 27 which rides in an annular groove.

The apparatus described so far is that necessary for translating the indication $f$ of meter A into an elapsed time interval $\Delta t_f$ proportional to $f$. The beginning of this interval is signallized by the electrical impulse received from the photocell, and at the end of the interval is signallized by the impulses received from contacts 21 and 22 mounted on panel C.

Assembly E shown in Figures 1 to 4 is devised for the purpose of translating the elapsed time interval $\Delta t_i$ into an angle of increment $\Delta \theta$. This is accomplished by interrupting the movement of the constant speed shaft by a magnetic clutch in such a manner that the extended shaft rotates at constant speed during the interval $\Delta t_i$ and is otherwise stationary. The constant speed shaft for this purpose is 31, which is driven by gear 29 which meshes with worm 30, as can be seen in Figure 4. Worm 30 is mounted upon the main drive shaft 9 which also drives the previously described worm 10. Shaft 31 therefore rotates at a speed which is either equal to or bears a fixed relation with the scanning speed.

Referring to Figure 1, it can be seen that shaft 31 enters the housing 28 and terminates in a non-magnetic disc 32 rigidly attached to shaft 31, which is, of course, constantly rotating.

The upper portion of assembly E comprises a removable, non-magnetic cap 33 which, although rectangular, has a cylindrical central hole 33a and circular embossed area 33b extending slightly below its lower face.

In between this lower circular area of cap 33 and continuously rotating disc 32 there is a flat iron disc 34 of such a thickness that, if lifted only a few thousandths of an inch such as .004", it will completely leave contact with rotating disc 32 and make contact with the stationary circular area at the bottom of cap 33.

This disc 34 is restrained radially and kept in position by means of a small pin 31a at the upper end of shaft 31 which fits inside of a small central hole 31b shown dotted in disc 34. Integrally fastened to the central portion of disc 34, but eccentrically rotated, is a metallic cylinder 35. A small steel pin 36 rides on this eccentric cylinder 35 and, as disc 34 rotates intermittently as occurs during normal operation, eccentric cylinder 35 and pin 36 rides on this eccentric cylinder 35 and, as disc 34 rotates intermittently as occurs during normal operation, eccentric cylinder 35 and pin 36 open and close a circuit connected to a small spring return, single pole switch 37, this being of a type such as the "Microswitch."

The proper functioning of disc 34 to cause it to rotate when desired and be stationary when desired is carried out by means of two magnetic circuits having a common armature, this being iron disc 34.

The upper magnetic circuit, shown in Figure 1, consists of a U-shaped laminated iron circuit 38, both faces of which rest very close to and directly above those portions of disc 34 which project out sidewise to make an assembly. This magnetic circuit is energized by coil 39. Similar lower magnetic circuit 40 is placed with its pole pieces very close to and directly under the protruding sections of disc 34. This magnetic circuit is energized by coil 41.

Hence, it can be seen that the disc 34 will rotate with shaft 31 if coil 41 is energized while coil 39 is not, and that, on the other hand, disc 34 will be held stationary if coil 39 is energized and coil 41 is not.

To translate the time interval $\Delta t_i$ into elapsed angle of increment, it is therefore only necessary to provide an electric circuit of such a nature that coil 41 is energized during this interval and coil 39 is energized outside this interval.

In Figure 5, such an electrical circuit is shown having the photocell 18 of Figure 1. It feeds a gaseous discharge triode T through an amplifier. If sufficient signal strength can be obtained from the photocell directly, the amplifier would be unnecessary.

The phasing of the circuit between the photocell and the gaseous discharge tube is so arranged that when the cell is illuminated, the positive voltage is applied to the grid of the gaseous tube. Hence, when the light signal is received from the scanning arm at the instant that it passes the pointer on the meter with the attached mirror, a positive pulse is applied to the grid of T.

In the circuit of Figure 5, C is the switch 21—22 shown in Figures 1 and 4 which is normally closed but is open momentarily once each revolution of the scanning arm at the moment the light beam passes the normal zero mark of the meter.

41 is the coil of the lower magnet of Figure 1 which, when energized, will cause counting disc 34 to revolve the constant speed shaft 31 of Figure 1. 39 is the coil of the upper magnet of Figure 1 which, when energized, will cause the counting disc to stop. Coil 39 carries an exact center tap which, in Figure 5, leads to the positive anode supply for tube T.

Examining the operation of the circuit of Figure 5, at the instant when the light beam has not yet reached the meter pointer: At this instant, the gaseous discharge tube T is not ionized and hence carries no current. Therefore, one-half of the winding 39 of the upper magnet carries current and the other half does not and also the lower magnet is without current. Hence, at this moment, the counting disc 34 is clamped by a magnetic force against cover 33 of the counting mechanism E and hence does not rotate.

As the light beam from the scanning arm passes the pointer of the meter, the photocell 18 receives a light impulse which is translated into a positive pulse on the grid of the gaseous discharge tube T. This positive pulse, as is well-known, initiates ionization in the gas discharge tube causing it to draw anode current. Hence, immediately after the light beam passes the pointer, it is apparent that both halves of the winding 39 carry current as well as the winding 41.

The resistances $R_1$, $R_2$ of Figure 5 are so adjusted that the current in the two halves of winding 39 are equal; hence, the magnetizing force of 39 is effectively neutralized, whereas the lower magnet 41 is energized. Therefore, at this instant, the counting disc 34 is snapped down from its previous position against the cover of mechanism E to a position in contact with the constant speed disc 32. Therefore, the counting disc 34 begins at this instant to rotate at constant speed.

It is well known that a gaseous discharge tube continues to draw plate current once ionization has been initiated by a grid pulse even though the grid voltage is removed. This condition will persist until the anode voltage is removed.

After the elapse of an interval $\Delta t_i$, the scanning beam has reached the normal zero position of the meter. At this instant, as previously described, the contacting mechanism C (21—22) opens. Reference to Figure 5 shows that this interrupts the anode circuit of tube T and hence returns the magnetic circuit to the status quo ante. This therefore stops the counting disc. A moment later, contact C (21—22) recloses, but in the interim gaseous tube T has deionized, and hence replacement of the plate voltage will not re-initiate ionization until a new positive grid pulse occurs. This cannot occur until the beginning of the nexa scanning cycle when the light beam once more passes the pointer.

Hence, it has been shown that the counting disc 34 rotates at constant speed during the interval $\Delta t_f$ but is otherwise stationary. Therefore, the accumulated angle of rotation of the counting disc is proportional to the interval with respect to time of the indication $f$ of meter A. This total accumulated angle may be indicated by a conventional counting means, or more particularly by the micro-switch 37 shown in Figure 1, if this micro-switch is connected to a conventional electrical pulse counter 37A shown schematically.

Up to this point in the description of the apparatus, it has been assumed that the scale of meter A was of the uniform linear type. If this is not the case, it is also possible to make the present invention operative and accurate by utilizing a non-uniform speed of rotation of the scanning arm 8. If, for instance, the angle of speed of scanning arm 8 is so controlled by a cam mechanism that it sweeps over equal scale portions of meter A in equal time intervals, the entire mechanism will perform exactly as described above.

The description so far has covered the simpler version of the invention wherein it is merely desired to obtain the interval with respect to time of one single physical quantity $f$ indicated by a pointer type meter.

It is now desired to combine two such devices measuring physical quantities $f$ and $g$ respectively with an additional apparatus to obtain the time integral of their product. As was explained earlier, this may be accomplished by a disc and roller mechanism which has itself a cycle of operation of the same duration as the scanning cycle.

To accomplish this multiplication, one preferably scans the two indicating meters $f$ and $g$ sequentially rather than simultaneously. This will always be possible if the scale arc of the meters does not exceed 180° as is almost always the case. Then, two scanning arms $8_1$ and $8_2$ can be so phased that the first completely scans the angular indication of meter $A_f$ before the second begins. The indication of the first meter $f$ is then used to fix the radius of contact of the roller after which the reading of the second meter $g$ determines the time of contact of the constant speed disc. At the end of the scanning cycle, a mechanism returns the roller to a neutral position as will be described. The means by which this is accomplished will be seen from a description of the subsequent figures.

In Figure 6, a low speed synchronous motor 50, has mounted on its shaft a gear 51 and a hardened steel disc 52. Extending across the face of this disc 52 and slightly away from it is a long shaft 53 so disposed that it may be both angularly oscillated and travel lengthwise. Mounted on this shaft 53 adjacent to disc 52 is an assembly consisting of a hardened steel wheel 54 which is indirectly supported from shaft 53 by means of a floating arm 55, a pin 56 and a spring 57. Normally, spring 57 forces the periphery of wheel 54 against a hardened steel insert 58 which is affixed as shown in member 59 which is pinned rigidly to shaft 53.

It is obvious that, when wheel 54 is not contacting disc 52, it will be tightly held and locked by contacting insert 58, spring 57 providing this pressure.

If, however, shaft 53 is rotated a few degrees until wheel 54 contacts disc 52 and is further slightly rotated to remove insert 58 from contacting wheel 54, then wheel 54 will be free to rotate in accordance with the R. P. M. of disc 52 and its radius from the center of this disc.

Figure 7:
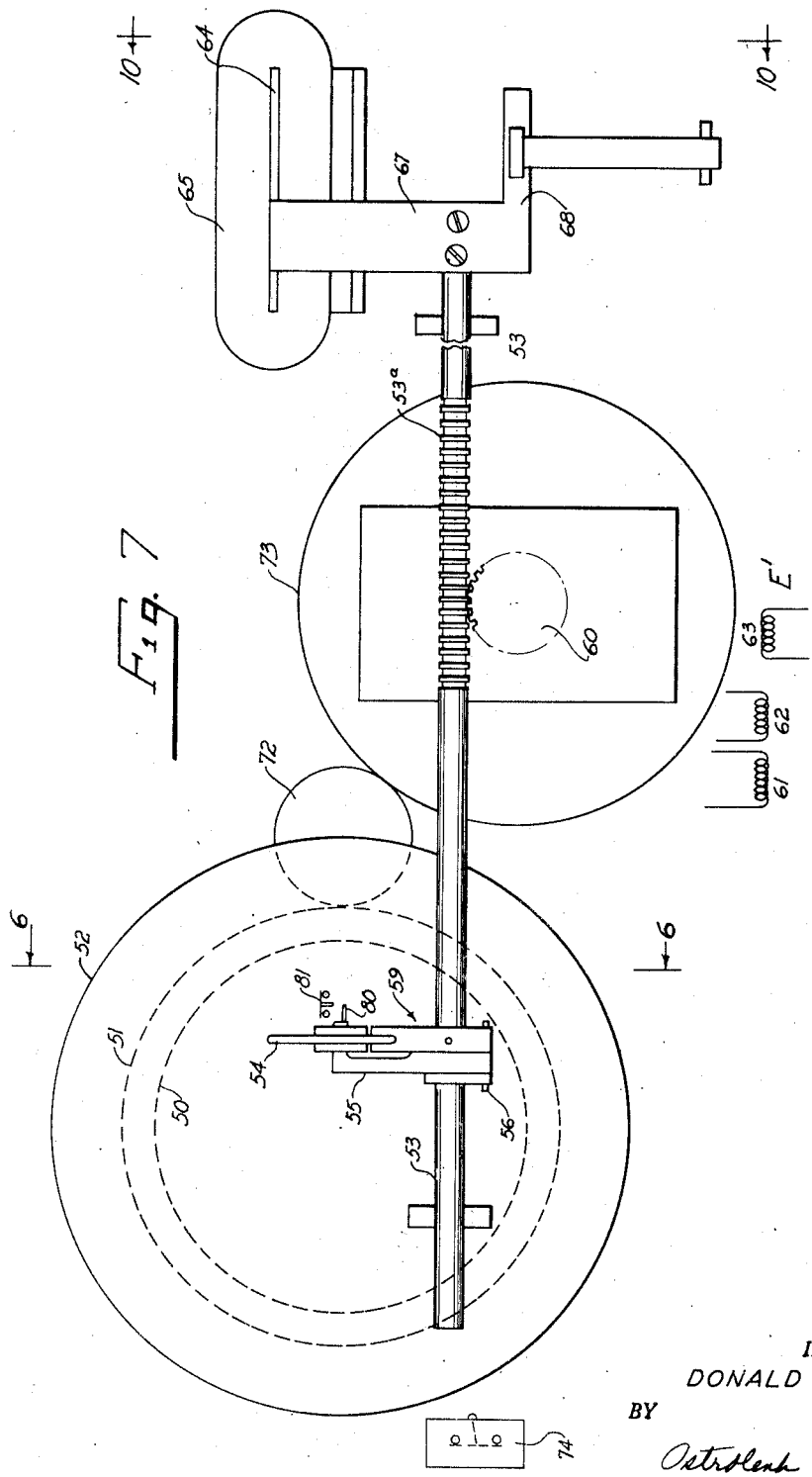
Figure 7 is a front view of the same device.

In Figure 7, another view of the same assembly is shown. To the right of this assembly is shown an assembly E' which is identical to assembly E of Figure 1 shown on the previous drawings with the following exceptions:

1. Assembly E' of Figure 7 is not provided with an eccentric and contact making mechanism driven by the disc as is assembly E of Figure 1 but, instead, is provided with a gear wheel 60 which is part of the disc shown as 34 of Figure 1.

2. Assembly E' of Figure 7 is provided with two separate windings 61 and 62 on the upper magnet. A winding 63 is provided on the lower magnet the same as on assembly E of Figure 1.

Shaft 53 has a portion of its length machined down to form a circular rack 53a which meshes with gear 60. It will thus be seen that for a given period of travel shaft 53 may travel from left to right and vice versa as directed by gear 60.

To the right of this assembly (Figure 10) is shown an electromagnet 64 formed of a U-shaped steel channel which is provided with a winding 65. An armature 67 is fastened to the right-hand end of shaft 53 so that, when magnet 64 is energized, the magnet will attract armature 67, rotating shaft 53 angularly, wheel 54 will contact disc 52, insert 58 will leave wheel 54, and wheel 54 will rotate by contact with disc 52.

Conversely, when magnet 64 is de-energized, an extension 68 of armature 67 is acted on by a roller 69 which is pulled toward the base of the device by a spring 70. This travel is restricted by a lower fixed roller 71 so that, when the magnet is de-energized, wheel 54 does not contact disc 52 and is prevented from coasting by contact with insert 58.

It should be observed that the main shaft of assembly E' of Figure 7 is driven from synchronous motor 50 by its gear 51, idler gear 72 and driven gear 73.

At the extreme left of Figure 7 is located a normally closed control switch 74 so arranged that, when shaft 53 has moved to the left so that wheel 54 is directly opposite the center of disc 52, switch 74 is caused to open its circuit.

In Figure 8 is shown a complete wiring diagram combining two integrators with a multiplier. The arrangement is such that the integrators perform their function independently of the multiplier, that is, the final indication of the integral of the quantity $f$, the integral of the quantity $g$, and the integral of the product $fg$ may be observed.

Figure 8 includes not only the control circuits for the integrators and multipliers described previously but also a cam switch F. The mechanical arrangement of this cam switch is shown in Figure 9.

In Figure 9, member 9 is the same main drive shaft used for the entire apparatus to which is attached a worm driving gear 75 which drives shaft 76 to which is attached a cam 78. Bearing on this cam is a follower 79 which actuates switch F, whose electrical function will be described in connection with Figure 8. The same push rod 79a which actuates switch F also actuates a reversing switch, as shown in Figure 8, which reverses the direction of motor 50 when switch F is in the right hand position.

Just preceding the scanning period of the first quantity F, cam 78 is so located that switch F is in the left hand position. In this position, it can be seen that windings 62 and 63 of the multiplier have been added in series with winding 41 of integrator $f$. It will also be seen that the winding of electro-magnet 65 is in series with winding 41 of integrator $g$. Winding 61 which constitutes half of the upper magnet of the multiplier is permanently excited from the main direct current source through a resistance.

Starting at a moment prior to the scanning period of the integrator $f$, the sequence of operations for one scanning cycle will be described. At this moment, the gas discharge triodes $T_f$ and $T_g$ are non-conducting and the switches $C_f$ and $C_g$ located on the shafts of the two integrators are closed. Moreover, roller 54 is located at the center of disc 52 but does not touch it. Switch 74 is open and switch F is in the left hand position.

A scanning arm $S_f$ passes its meter pointer and a pulse is delivered to triode $T_f$ which initiates the integrating period for that integrator. However, in addition, it causes current to flow in one half of the upper winding 62 of the multiplier and in the lower winding 63. This neutralizes the upper magnet and energizes the lower magnet and causes the shaft 60 of the integrator G to rotate in a clockwise direction shown in Figure 7. A moment after shaft 60 begins this rotation, shaft 53 has moved sufficiently to close switch 74.

A rotation of shaft 60 at a constant speed therefore persists until the scanning arm 8 of integrator $f$ passes the zero position of meter $A_f$. At that instant, switch $C_f$ is opened thereby deenergizing windings 62 and 63 and allowing the permanently energized winding 61 to stop the rotation of shaft 60 in a manner exactly similar to that used in mechanisms E. Shaft 60 has therefore rotated at constant speed for an interval of time $\Delta t_f$ which is proportional to the indication of meter $A_f$.

During this time, roller 54 is not in contact with constant speed disc 52 and is therefore not rotating. It has, however, been displaced radially from the center of disc 52 by a distance $r$ which is proportional to $\Delta t_f$.

Some time after the first integrator has completed its scanning operation, the second integrator begins, that is scanning arm $S_g$ passes its pointer and sends a light flash into photo-tube 18$g$ which in turn throws a positive bolt onto the grid of $T_g$ thereby energizing magnet 65. At this instant, armature 67 is attracted to this magnet thereby rotating shaft 53 so that roller 54 contacts disc 52. Rotation at the constant speed of roller 54 is therefore initiated and its speed of rotation is directly proportional to the indication of the first meter $A_f$.

The rotating condition of roller 54 persists until the second scanning arm $S_g$ passes the zero position of the second meter $A_g$ at which instant switch $C_g$ is open thereby de-energizing winding 65 and releasing roller 54 from contact with the constant speed disc.

The total increment of the angle through which roller 54 has therefore rotated is now seen to be proportional to the product of the two quantities $f$ and $g$.

Subsequent to the scanning period of the second integrator, cam 78 maintains a position which moves switch F to the right hand position and simultaneously actuates the reversing switch of motor 50. This, it is seen, re-energizes coils 62 and 63 and therefore initiates rotation of shaft 60 but this time in the opposite direction since motor 50 has been reversed. Shaft 53, the associated mechanism, therefore moves leftward in everything. However, when roller 54 has attained a neutral position at the center of disc 52, micro-switch 74 is opened thereby de-energizing coils 62 and 63 and stopping the rotation of shaft 60. The cycle of operation is therefore complete and the conditions are again the same as at the beginning of the scanning period, except that roller 54 has been advanced to an angle proportional to the product $fg$.

On wheel 54 is located a small eccentric pin 80 which operates on an off once per revolution, a small switch 81 which electrically registers the revolutions of wheel 54 on an electric counter which gives the product $fg$.

Another method of accomplishing the reversal of shaft 60 for the purpose of returning roller 54 to a suitable position would be to use a constant speed drive which could readily be taken from the main shaft 9, instead of a reversing switch to utilize an electromagnetically operating magnetic clutch. This would eliminate the extra motor 50.

In the foregoing, I have described my invention in connection only with a preferred embodiment thereof. Many modifications and variations of my invention within the principles above set forth should now be obvious to those skilled in the art. Accordingly, I prefer to be bound not by the specific disclosures herein, but only by the appended claims.

I claim:

1. A device for determining the integral with respect to time of a meter reading, said meter having a movable indicator, a light reflector on said indicator; said device comprising a rotatable arm carrying a light source; means for moving said rotatable arm with respect to said indicator to cause light from said light source to strike said reflector in a recurrent regular manner; a photosensitive member; means for directing light reflected from said reflecting surface to said photosensitive member; a switch; electrically controlled means for operating said switch; said photosensitive member comprising a portion of said electrically controlled means; means including the photosensitive member operable to initiate the operation of said electrically controlled means at the angular position of said arm at which light is reflected to said photosensitive member; and means for halting the operation of said electrically controlled means at a predetermined angular position of said arm; said electrically controlled means comprising a rotatable cam, a connection between the cam and switch for operating the switch; a constantly rotating shaft, a clutch between said shaft and cam; said photosensitive member and said means operable by the arm respectively operating said clutch for connecting and disconnecting said shaft and cam.

2. A device for determining the integral with respect to time of a meter reading, said meter having a movable indicator, a light reflector on said indicator; said device comprising a rotatable arm carrying a light source; means for moving said rotatable arm with respect to said indicator to cause light from said light source to strike said reflector in a recurrent regular manner; a photosensitive member; means for directing light reflected from said reflecting surface to said photosensitive member; a switch; electrically controlled means for operating said switch; said photosensitive member comprising a portion of said electrically controlled means; means including the photosensitive member operable to initiate the operation of said electrically controlled means at the angular position of said arm at which light is reflected to said photosensitive member; and means for halting the operation of said electrically controlled means at a predetermined angular position of said arms; said electrically controlled means comprising a rotatable cam, a connection between the cam and switch for operating the switch; a constantly rotatable shaft; a magnetic clutch between said shaft and cam; said photosensitive member and said means operable by the arm respectively operating said clutch for connecting and disconnecting said shaft and cam.

3. A device for determining the integral with respect to time of a meter reading, said meter having a movable indicator, a light reflector on said indicator; said device comprising a rotatable arm carrying a light source; means for moving said rotatable arm with respect to said indicator to cause light from said light source to strike said reflector in a recurrent regular manner; a photosensitive member; means for directing light reflected from said reflecting surface to said photosensitive member; a switch; electrically controlled means for operating said switch; said photosensitive member comprising a portion of said electrically controlled means; means including the photosensitive member operable to initiate the operation of said electrically controlled means at the angular position of said arm at which light is reflected to said photosensitive member; and means for halting the operation of said electrically controlled means at a predetermined angular position of said arm; said electrically controlled means comprising a rotatable cam, a connection between the cam and switch for operating the switch; a constantly rotatable shaft; a magnetic clutch between said shaft and cam; said photosensitive member and said means operable by the arm respectively operating said clutch for connecting and disconnecting said shaft and cam; said magnetic clutch comprising a plate carried by said shaft and a magnetizable member carried by said cam; and a magnet operable to move said magnetizable member against and away from said plate.

4. A device for determining the integral with respect to time of a meter reading, said meter having a movable indicator, a light reflector on said indicator; said device comprising a rotatable arm carrying a light source; means for moving said rotatable arm with respect to said indicator to cause light from said light source to strike said reflector in a recurrent regular manner; a photosensitive member; means for directing light reflected from said reflecting surface to said photosensitive member; a switch; electrically controlled means for operating said switch; said photosensitive member comprising a portion of said electrically controlled means; means including the photosensitive member operable to initiate the operation of said electrically controlled means at the angular position of said arm at which light is reflected to said photosensitive member; and means for halting the operation of said electrically controlled means at a predetermined angular position of said arm; said electrically controlled means comprising a rotatable cam, a connection between the cam and switch for operating the switch; a constantly rotatable shaft; a magnetic clutch between said shaft and cam; said photosensitive member and said means operable by the arm respectively operating said clutch for connecting and disconnecting said shaft and cam; said magnetic clutch comprising a plate carried by said shaft and a magnetizable member carried by said cam; and a pair of magnets; the poles of one magnet being arranged on one side of said magnetizable member, and the poles of the other magnet being arranged on the other side of said magnetizable member; said magnets each having energizing coils.

5. A device for determining the integral with respect to time of a meter reading, said meter having a movable indicator, a light reflector on said indicator; said device comprising a rotatable arm carrying a light source; means for moving said rotatable arm with respect to said indicator to cause light from said light source to strike said reflector in a recurrent regular manner; a photosensitive member; means for directing light reflected from said reflecting surface to said photosensitive member; a switch; electrically controlled means for operating said switch; said photosensitive member comprising a portion of said electrically controlled means; means including the photosensitive member operable to initiate the operation of said electrically controlled means at the angular position of said arm at which light is reflected to said photosensitive member; and means for halting the operation of said electrically controlled means at a predetermined angular position of said arm; said electrically controlled means comprising a rotatable cam, a connection between the cam and switch for operating the switch; a constantly rotatable shaft; a magnetic clutch between said shaft and cam; said photosensitive member and said means operable by the arm respectively operating said clutch for connecting and disconnecting said shaft and cam; said magnetic clutch comprising a plate carried by said shaft and a magnetizable member carried by said cam; and a pair of magnets; the poles of one magnet being arranged on one side of said magnetizable member, and the poles of the other magnet being arranged on the other side of said magnetizable member; said magnets each having energizing coils alternately energized in accordance with the condition of said arm operated means and said photosensitive member.

6. A device for determining the integral with respect to time of a meter reading, said meter having a movable indicator, a light reflector on said indicator; said device comprising a rotatable arm carrying a light source; means for moving said rotatable arm with respect to said indicator to cause light from said light source to strike said reflector in a recurrent regular manner; a photosensitive member; means for directing light reflected from said reflecting surface to said photosensitive member; a switch; electrically controlled means for operating said switch; said photosensitive member comprising a portion of said electrically controlled means; means including the photosensitive member operable to initiate the operation of said electrically controlled means at the angular position of said arm at which light is reflected to said photosensitive member; and means for halting the operation of said electrically controlled means at a predetermined angular position of said arm; said electrically controlled means comprising a rotatable cam, a connection between the cam and switch for operating the switch; a constantly rotatable shaft; a magnetic clutch between said shaft and cam; said photosensitive member and said means operable by the arm respectively operating said clutch for connecting and disconnecting said shaft and cam; said magnetic clutch comprising a plate carried by said shaft and a magnetizable member carried by said cam; and a pair of magnets; the poles of one magnet being arranged on one side of said magnetizable member, and the poles of the other magnet being arranged on the other side of said magnetizable member; said magnets each having energizing coils alternately energized in accordance with the condition of said arm operated means and said photosensitive member; one magnet being energized to drive said magnetizable member against said plate when said arm operated means is operated by movement of the arm past said predetermined angular position.

7. A device for determining the integral with respect to time of a meter reading, said meter having a movable indicator, a light reflector on said indicator; said device comprising a rotatable arm carrying a light source; means for moving said rotatable arm with respect to said indicator to cause light from said light source to strike said reflector in a recurrent regular manner; a photosensitive member; means for directing light reflected from said reflecting surface to said photosensitive member; a switch; electrically controlled means for operating said switch; said photo-sensitive member comprising a portion of said electrically controlled means; means including the photosensitive member operable to initiate the operation of said electrically controlled means at the angular position of said arm at which light is reflected to said photosensitive member; and means for halting the operation of said electrically controlled means at a predetermined angular position of said arm; said electrically controlled means comprising a rotatable cam, a connection between the cam and switch for operating the switch; a constantly rotatable shaft; a magnetic clutch between said shaft and cam; said photosensitive member and said means operable by the arm respectively operating said clutch for connecting and disconnecting said shaft and cam; said magnetic clutch comprising a plate carried by said shaft and a magnetizable member carried by said cam; and a pair of magnets; the poles of one magnet being arranged on one side of said magnetizable member, and the poles of the other magnet being arranged on the other side of said magnetizable member; said magnets each having energizing coils alternately energized in accordance with the condition of said arm operated means and said photo-sensitive member; one magnet being energized to drive said magnetizable member against said plate when said arm operated means is operated by movement of the arm past said predetermined angular position; said magnet being de-energized when said arm passes said photosensitive member.

8. A device for determining the integral with respect to time of a meter reading, said meter having a movable indicator, a light reflector on said indicator; said device comprising a rotatable arm carrying a light source; means for moving said rotatable arm with respect to said indicator to cause light from said light source to strike said reflector in a recurrent regular manner; a photosensitive member; means for directing light reflected from said reflecting surface to said photosensitive member; a switch; electrically controlled means for operating said switch; said photosensitive member comprising a portion of said electrically controlled means; means including the photosensitive member operable to initiate the operation of said electrically controlled means at the angular position of said arm at which light is reflected to said photosensitive member; and means for halting the operation of said electrically controlled means at a predetermined angular position of said arm; said electrically controlled means comprising a rotatable cam, a connection between the cam and switch for operating the switch; a constantly rotatable shaft; a magnetic clutch between said shaft and cam; said photo-sensitive member and said means operable by the arm respectively operating said clutch for connecting and disconnecting said shaft and cam; said magnetic clutch comprising a plate carried by said shaft and a magnetizable member carried by said cam; and a pair of magnets; the poles of one magnet being arranged on one side of said magnetizable member, and the poles of the other magnet being arranged on the other side of said magnetizable member; said magnets each having energizing coils alternately energized in accordance with the condition of said arm operated means and said photosensitive member; one magnet being energized to drive said magnetizable member against said plate when said arm operated means is operated by movement of the arm past said predetermined angular position; said magnet being de-energized when said arm passes said photo-sensitive member; the other magnet being energized to drive said magnetizable member away from said plate when said arm passes said photo-sensitive member.

9. A device for determining the integral with respect to time of a meter reading, said meter having a movable indicator, a light reflector on said indicator; said device comprising a rotatable arm carrying a light source; means for moving said rotatable arm with respect to said indicator to cause light from said light source to strike said reflector in a recurrent regular manner; a photosensitive member; means for directing light reflected from said reflecting surface to said photosensitive member; a switch; electrically controlled means for operating said switch; said photosensitive member comprising a portion of said electrically controlled means; means including the photosensitive member operable to initiate the operation of said electrically controlled means at the angular position of said arm at which light is reflected to said photosensitive member; and means for halting the operation of said electrically controlled means at a predetermined angular position of said arm; said electrically controlled means comprising a rotatable cam, a connection between the cam and switch for operating the switch; a constantly rotatable shaft; a magnetic clutch between said shaft and cam; said photosensitive member and said means operable by the arm respectively operating said clutch for connecting and disconnecting said shaft and cam; said magnetic clutch comprising a plate carried by said shaft and a magnetizable member carried by said cam; and a pair of magnets; the poles of one magnet being arranged on one side of said magnetizable member, and the poles of the other magnet being arranged on the other side of said magnetizable member; said magnets each having energizing coils alternately energized in accordance with the condition of said arm operated means and said photosensitive member; one magnet being energized to drive said magnetizable member against said plate when said arm operated means is operated by movement of the arm past said predetermined angular position; said magnet being de-energized when said arm passes said photo-sensitive member; the other magnet being energized to drive said magnetizable member away from said plate when said arm passes said photosensitive member and being de-energized when the arm passes said predetermined angular position.

10. A device for determining the integral with respect to time of the product of a pair of meters each meter having a movable indicator, a reflecting surface on said indicator; each meter having associated therewith a device comprising a movable member carrying a light source; means for moving said movable member with respect to said indicator to cause light from said light source to strike said reflecting surface in a recurrent regular manner; a photosensitive member; means for directing light reflected from said reflecting surface to said photosensitive member; a switch, electrically controlled means for operating the switch; the photosensitive members for each meter comprising a portion of said electrically controlled means; said switch being operable in response to both said photosensitive members.

11. A device for determining the integral with respect to time of the product of a pair of meters each meter having a movable indicator, a reflecting surface on said indicator; each meter having associated therewith a device comprising a movable member carrying a light source; means for moving said movable member with respect to said indicator to cause light from said light source to strike said reflecting surface in a recurrent regular manner; a photosensitive member; means for directing light reflected from said reflecting surface to said photosensitive member; a switch, electrically controlled means for operating the switch; the photosensitive members for each meter comprising a portion of said electrically controlled means; said electrically controlled means comprising a disc and a rotating roller; said roller being engageable with the surface of the disc and movable radially of the disc; the photosensitive member for one meter controlling the radial position of the roller with respect to the disc; the photosensitive member of the other meter controlling the time of contact of the roller with the disc; said disc being connected to said switch.

12. A device for recording meter readings, said meter having a movable indicator, a light reflector on said indicator; said device comprising a rotatable arm carrying a light source; means for moving said rotatable arm with respect to said indicator to cause light from said light source to strike said reflector in a recurrent regular manner; a photosensitive member; means for directing light reflected from said reflecting surface to said photosensitive member; electrically controlled switching means; means including the photosensitive member operable to initiate the operation of said electrically controlled means at the angular position of said arm at which light is reflected to said photosensitive member; and means for halting the operation of said electrically controlled means at a predetermined angular position of said arm; said electrically controlled means comprising a rotatable cam, a connection between the cam and counter for operating the counter; a constantly rotating shaft, a clutch between said shaft and cam; said photosensitive member and said means operable by the arm respectively operating said clutch for connecting and disconnecting said shaft and cam.

13. A device for recording meter readings, said meter having a movable indicator, a light reflector on said indicator; said device comprising a rotatable arm carrying a light source; means for moving said rotatable arm with respect to said indicator to cause light from said light source to strike said reflector in a recurrent regular manner; a photosensitive member; means for directing light reflected from said reflecting surface to said photosensitive member; electrically controlled switching means; means including the photosensitive member operable to initiate the operation of said electrically controlled means at the angular position of said arm at which light is reflected to said photosensitive member; and means for halting the operation of said electrically controlled means at a predetermined angular position of said arm; said electrically controlled means comprising a rotatable cam; a connection between the cam and counter for operating the counter; a constantly rotatable shaft; a magnetic clutch between said shaft and cam; said photosensitive member and said means operable by the arm respectively operating said clutch for connecting and disconnecting said shaft and cam; said magnetic clutch comprising a plate carried by said shaft and a magnetizable member carried by said cam; a pair of magnets; the poles of one magnet being arranged on one side of said magnetizable member, and the poles of the other magnet being arranged on the other side of said magnetizable member; said magnets each having energizing coils.

14. A device for recording meter readings, said meter having a movable indicator, a light reflector on said indicator; said device comprising a rotatable arm carrying a light source; means for moving said rotatable arm with respect to said indicator to cause light from said light source to strike said reflector in a recurrent regular manner; a photo-sensitive member; means for directing light reflected from said reflecting surface to said photosensitive member; electrically controlled switching means; means including the photosensitive member operable to initiate the operation of said electrically controlled means at the angular position of said arm at which light is reflected to said photosensitive member; and means for halting the operation of said electrically controlled means at a predetermined angular position of said arm; said electrically controlled means comprising a rotatable cam, a connection between the cam and counter for operating the counter; a constantly rotatable shaft; a magnetic clutch between said shaft and cam; said photosensitive member and said means operable by the arm respectively operating said clutch for connecting and disconnecting said shaft and cam; said magnetic clutch comprising a plate carried by said shaft and a magnetizable member carried by said cam; a pair of magnets; the poles of one magnet being arranged on one side of said magnetizable member, and the poles of the other magnet being arranged on the other side of said magnetizable member; said magnets each having energizing coils alternately energized in accordance with the condition of said arm operated means and said photosensitive member; one magnet being energized to drive said magnetizable member against said plate when said arm is at the angular position at which light is reflected to the photosensitive member.

15. A device for recording meter readings, said meter having a movable indicator, a light reflector on said indicator; said device comprising a rotatable arm carrying a light source; means for moving said rotatable arm with respect to said indicator to cause light from said light source to strike said reflector in a recurrent regular manner; a photo-sensitive member; means for directing light reflected from said reflecting surface to said photosensitive member; electrically controlled switching means; means including the photosensitive member operable to initiate the operation of said electrically controlled means at the angular position of said arm at which light is reflected to said photosensitive member; and means for halting the operation of said electrically controlled means at a predetermined angular position of said arm; said electrically controlled means comprising a rotatable cam, a connection between the cam and counter for operating the counter; a constantly rotatable shaft; a magnetic clutch between said shaft and cam; said photosensitive member and said means operable by the arm operating said clutch for connecting and disconnecting said shaft and cam; said magnetic clutch comprising a plate carried by said shaft and a magnetizable member carried by said cam; a pair of magnets; the poles of one magnet being arranged on one side of said magnetizable member, and the poles of the other magnet being arranged on the other side of said magnetizable member; said magnets each having energizing coils alternately energized in accordance with the condition of said arm operated means and said photo-sensitive member; one magnet being energized to drive said magnetizable member against said plate when said arm is at the angular position at which light is reflected to the photosensitive member; the other magnet being energized to drive said magnetizable member away from said plate when said arm passes said predetermined angular position.

DONALD I. BOHN.

REFERENCES CITED

The following references are of record in the file of this patent:

UNITED STATES PATENTS

| Number | Name | Date |
|---|---|---|
| 1,638,103 | Roucka | Aug. 9, 1927 |
| 1,885,098 | Hill | Oct. 25, 1932 |
| 2,046,005 | Sprecker | June 30, 1936 |
| 2,061,441 | Smith | Nov. 17, 1936 |
| 2,105,470 | Bower | Jan. 18, 1938 |
| 2,176,720 | Rayner | Oct. 17, 1939 |
| 2,199,769 | Woodley | May 7, 1940 |
| 2,240,545 | Bryce | May 6, 1941 |
| 2,393,186 | Potter | Jan. 15, 1946 |